United States Patent
Zieba et al.

(10) Patent No.: US 10,976,561 B2
(45) Date of Patent: Apr. 13, 2021

(54) OPTICAL DEVICES WITH AZIMUTHAL MODULATOR LAYER

(71) Applicant: VIAVI SOLUTIONS INC., San Jose, CA (US)

(72) Inventors: Jaroslaw Zieba, Santa Rosa, CA (US); Johannes P. Seydel, Petaluma, CA (US)

(73) Assignee: VIAVI SOLUTIONS INC., San Jose, CA (US)

( * ) Notice: Subject to any disclaimer, the term of this patent is extended or adjusted under 35 U.S.C. 154(b) by 237 days.

(21) Appl. No.: 16/024,260

(22) Filed: Jun. 29, 2018

(65) Prior Publication Data

US 2020/0004032 A1 Jan. 2, 2020

(51) Int. Cl.
| | | |
|---|---|---|
| *G02B 27/09* | (2006.01) | |
| *G02B 1/14* | (2015.01) | |
| *G02B 5/26* | (2006.01) | |
| *G02B 5/22* | (2006.01) | |
| *C09C 1/00* | (2006.01) | |

(52) U.S. Cl.
CPC ........... *G02B 27/0977* (2013.01); *G02B 1/14* (2015.01); *G02B 5/22* (2013.01); *G02B 5/223* (2013.01); *G02B 5/26* (2013.01); *C09C 1/0015* (2013.01); *C09C 2200/1054* (2013.01); *C09C 2200/24* (2013.01); *C09C 2200/301* (2013.01)

(58) Field of Classification Search
CPC .............. C09D 1/0015; C09D 220/301; C09D 2200/1054; C09D 2200/24; G02B 1/14; G02B 5/223; G02B 5/26; G02B 27/0977; G02B 5/22; C09C 1/0015; C09C 220/301; C09C 2200/1054; C09C 2200/24

See application file for complete search history.

(56) References Cited

U.S. PATENT DOCUMENTS

2002/0160194 A1* 10/2002 Phillips .................. B42D 25/29
428/403

FOREIGN PATENT DOCUMENTS

| EP | 3266835 | 1/2018 |
|---|---|---|
| EP | 3269780 | 1/2018 |
| WO | 95/29140 | 11/1995 |
| WO | 02/40600 | 5/2002 |

* cited by examiner

*Primary Examiner* — Patrick D Niland
(74) *Attorney, Agent, or Firm* — Mannava & Kang, P.C.

(57) ABSTRACT

An optical device includes a reflector layer having a first surface, a second surface opposite the first surface; a third surface, and a fourth surface opposite the third surface; and a first selective light modulator layer external to the first surface of the reflector layer; in which at least one of the third surface and the fourth surface includes an azimuthal modulator layer. A method of making an optical device is also disclosed.

16 Claims, 3 Drawing Sheets

OPTICAL DEVICES WITH AZIMUTHAL MODULATOR LAYER

FIELD OF THE INVENTION

The present disclosure generally relates to articles, such as optical devices in the form of foil, sheets, and/or flakes. The optical device can include a reflector layer having a first surface, a second surface opposite the first surface, a third surface, and a fourth surface opposite the third surface; and a first selective light modulator layer external to the first surface of the reflector layer; wherein at least one of the third surface and the fourth surface includes an azimuthal modulator layer. Methods of making the optical devices are also disclosed.

BACKGROUND OF THE INVENTION

Optical attributes of a pigment are based upon the components present in the pigment. For example, a "white colored" reflector layer, such as those made with aluminum, will provide a limited color space attribute to a pigment. Additionally, the use of an aluminum reflector layer can require the addition of corrosion protection mechanisms, such as passivation to eliminate the risk of water-induced corrosion of the aluminum. Corrosion can lead to loss of reflector function and formation of hydrogen. Both of these problems can be detrimental to the pigment and can restrict its use. Further, the use of a "white colored" reflector layer can limit the ability of a pigment to produce a color flop and/or a color shifting effect.

SUMMARY OF THE INVENTION

In an aspect, there is disclosed an optical device including a reflector layer having a first surface, a second surface opposite the first surface; a third surface, and a fourth surface opposite the third surface; and a first selective light modulator layer external to the first surface of the reflector layer; in which at least one of the third surface and the fourth surface includes an azimuthal modulator layer.

In another aspect, there is disclosed a method for manufacturing an optical device, comprising: depositing on a substrate a reflector layer having a first surface, a second surface opposite the first surface, a third surface, and a fourth surface opposite the third surface; depositing on the first surface of the reflector layer a first selective light modulator layer; and providing an azimuthal modulator layer on at least one of the third surface and the fourth surface of the reflector layer.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

Throughout this specification and figures like reference numbers identify like elements.

DETAILED DESCRIPTION OF THE INVENTION

It is to be understood that both the foregoing general description and the following detailed description are exemplary and explanatory only, and are intended to provide an explanation of various embodiments of the present teachings. In its broad and varied embodiments, disclosed herein are articles, such as optical devices, for example, in the form of foils, sheets, and flakes; and a method of manufacturing the article. In an example, the articles including optical devices, such as pigments, optical taggants, and optical security devices can be manufactured with a simplified construction. The optical devices disclosed herein can exhibit at least one property including, but not limited to, reduced degradation of a reflector layer, reduced formation of hydrogen on a reflector layer, and improved color attributes.

Figure 1:
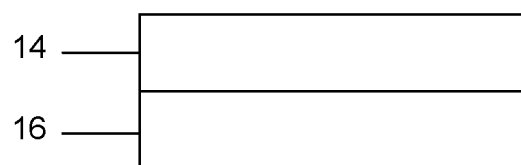
FIG. 1 is a cross-sectional view of an article according to an aspect of the present disclosure.
Figure 2:
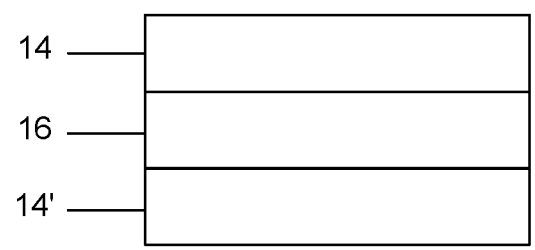
FIG. 2 is a cross-sectional view of an article according to another aspect of the present disclosure.

As illustrated in FIG. 1, an article 10, such as an optical device, can include a reflector layer 16; and a selective light modulator layer 14 external to the reflector layer and deposited using a liquid coating process. In an aspect, the selective light modulator layer 14 can be a first selective light modulator layer 14 or a second selective light modulator layer 14', as shown in FIG. 2. The reflector layer 16 can be a colored reflector layer 16. The reflector layer 16 can have open surfaces. The reflector layer 16 can have at least one surface that includes an azimuthal modulator layer 12, as shown in FIGS. 3-8.

In an aspect, the article 10 can be in a form of a sheet that can be used on an object or a substrate. In another aspect, the article 10 can be in a form of a foil or flake. For example, the article 10 can have a lamellar shape. In an aspect, the article 10 can be an optical device. In another aspect, a composition can include the optical device and a liquid medium. The composition can be an ink, a varnish, a paint, etc. In another aspect, the article 10 is an optical device in the form of a flake, for example having 100 nm to 100 μm in thickness and 100 nm to 1 mm in size. The article 10 can be a color shifting colorant, or can be used as a security feature for currency. Some attributes common to use of the article 10 can include high chromaticity (or strong color), color change with respect to viewing angle (also known as goniochromaticity or iridescence), and flop (a specular and metallic appearance that varies in lightness, hue, or chromaticity as the viewing angle varies). Additionally, the article 10 can be metallic in color and cannot exploit interference to generate color. In particular, the article 10 can include an additional feature for adding angle dependent color shifting effects. Further, the article 10 can exhibit improved chemical protection of exposed metal surfaces, such as the edges of a reflector layer 16, but without the need for encapsulating the entire article 10.

Although the Figures illustrate an article 10, such as an optical device, in the form of a sheet, the article 10, such as an optical device can also be in a form of a flake, and/or a foil, according to various aspects of the present disclosure. Additionally, although the Figures illustrate specific layers in specific orders, one of ordinary skill in the art would appreciate that the article 10 can include any number of layers in any order. Additionally, the composition of any particular layer can be the same or different from the composition of any other layer. For example, a first selective light modulator layer (SLML) 14 can be the same or different composition than a second selective light modulator layer (SLML) 14'. Further, the physical properties of any particular layer can be the same or different from the physical properties of any other layer. For example, a first SLML 14 can have a composition with a first refractive index, but a second SLML 14' in the same article 10 can have a different composition with a different refractive index. As another example, a first SLML 14 can have a composition at a first thickness, but the second SLML 14' can have the same composition at a second thickness different from the first thickness.

As illustrated in FIG. 1, an article 10, such as an optical device, can comprise a colored reflector layer 16 having a first surface, a second surface opposite the first surface, and a third surface; and a selective light modulator layer external to the first surface of the colored reflector layer 16.

A reflector layer 16 can be a wideband reflector, e.g., spectral and Lambertian reflector (e.g., white $TiO_2$). The reflector layer 16 can include a metal. The reflector layer 16 can be a colored reflector layer. As used herein, "colored reflector layer" includes a colored metal, a colored metal alloy, a colored non-metal, and metals chemically converted into a colored compound. The colored reflector layer 16 can be a colored metal or colored metal alloy chosen from copper, gold, silver, and bronze. The colored reflector layer 16 can be a colored non-metal including organic materials like polyacetylene, conducting polymers (e.g., polypyrroles, PEDOT, polyanilines), semiconductors, and inorganic materials like metal oxides, sulfides, chlorides, fluorides, titanates, zirconates, rare earth-doped $CaF_2$, transition metal-doped $SrTiO_3$ and $CaTiO_3$, iron or sulfur-doped sodalite, and metal coordination complexes.

In an aspect, the reflector layer 16, such as a colored reflector layer, can include a metal that is chemically converted into a colored compound. For example, the metal that is chemically converted can include aluminum, stainless steel, and white-colored materials. In an aspect, the metal to be chemically converted can include, but is not limited to, aluminum, copper, stainless steel, silver, gold, zinc, iron, bronzes, manganese, titanium, zirconium, vanadium, niobium, chromium, molybdenum, nickel, tungsten, tin, indium, bismuth, alloys of any of these metals, or a combination thereof. The conversion process can be any process that converts a non-colored or white colored metal to a colored compound. The conversion process can include subjecting a non-colored or white colored metal to a reactant.

The reactant can be in any state, such as plasma state, gas state, solid state, or liquid state or a combination thereof. The reactant can include any chemical or physical factors that can cause a reaction with at least a part of the non-colored or white colored metal, in a controllable manner. In one example, a water and solvent-borne environment can be used as the reactant. In some examples, the conversion process can include the use of various types of chemical reactants, including batch and continuous stirred tank reactants, tubular reactants, tumbling bed reactants, fluidized bed reactants, continuous flow tube and batch furnaces.

The chemical bath composition used herein can include an inorganic compound or an organic compound. An example of an inorganic compound can include at least one of sulfur, sulfides, sulfates, oxides, hydroxides, isocyanates, thiocyanates, molybdates, chromates, permanganates, carbonates, thiosulfates, colloidal metals, inorganic salts, and mixtures thereof. An example of an organic compound can include an organic compound that contains sulfur, such as thiols, thioamine, oxythio amines, thiourea, thiocyanates; nitrogen, such as amines, and isocyanates; oxygen; silicon, such as silanes; or a combination thereof. Further, the chemical bath can include at least one of inorganic or organic salts of metals or metallic organic compounds of metals. In yet another aspect, the chemical bath can include an oxidizing agent, a surface modifier, and/or an inhibitor.

In an aspect, the non-colored or white colored metal present in a reflector layer 16 can be completely converted or partially converted, such as 99.9% converted, including all ranges of percent conversion in between.

In an aspect, the colored reflector layer 16 does not include aluminum or a white-colored material, for example, aluminum or a white-colored material that has not been chemically converted into a colored compound.

In one example, the materials for the reflector layer 16 can include any materials that have reflective characteristics in the desired spectral range. For example, any material with a reflectance ranging from 5% to 100% in the desired spectral range.

The thickness of the reflector layer 16 can range from about 5 nm to about 5000 nm, although this range should not be taken as restrictive. For example, the lower thickness limit can be selected so that the reflector layer 16 can provide a maximum transmittance of 0.8.

In order to obtain a sufficient optical density and/or achieve a desired effect, a higher or lower minimum thicknesses can be required depending of the composition of the reflector layer 16. In some examples, the upper limit can be about 5000 nm, about 4000 nm, about 3000 nm, about 1500 nm, about 200 nm, and/or about 100 nm. In one aspect, the thickness of the reflector layer 16 can range from about 10 nm to about 5000 nm for example, from about 15 nm to about 4000 nm, from about 20 nm to about 3000 nm, from about 25 nm to about 2000 nm, from about 30 nm to about 1000 nm, from about 40 nm to about 750 nm, or from about 50 nm to about 500 nm, such as from about 60 nm to about 250 nm or from about 70 nm to about 200 nm.

Figure 7:
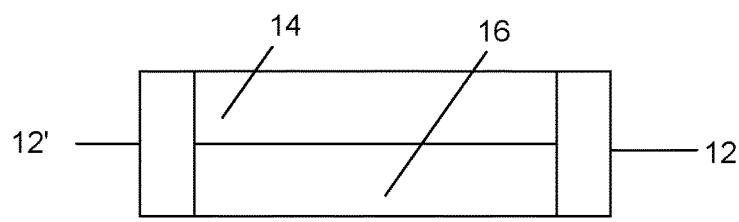
FIG. 7 is a cross-sectional view of an article according to another aspect of the present invention.
Figure 8:
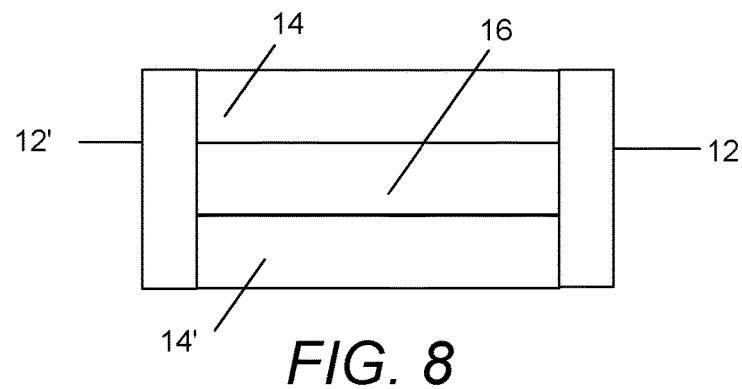
FIG. 8 is a cross-sectional view of an article according to another aspect of the present invention.

As shown in the Figures, for example FIG. 1, at least two surfaces/sides of the reflector layer 16, for example, the right (third) and left (fourth) surface/side as shown, can be open. In an aspect, if the article 10 is in the form of a flake or foil, then reflector layer 16 can include more than the four surfaces exemplified in the Figures. In those instances, for example, one, two, three, four, or five surfaces of the reflector layer 16 can be open to the air. In an example, open sides, i.e., surfaces of the reflector layer 16 that do not contain an external layer, can be an advantage for flop. In another aspect, as shown in FIGS. 7 and 8, the article 10 can include a reflector layer 16 and/or a SLML layer 14 that is not open, i.e., that have an azimuthal layer 12, 12' external to a side surface, such as side surface of the reflector layer 16 and/or the SLML layer 14. In another aspect, any surface of the reflector layer 16, the SLML 14, and/or the azimuthal layer 12 can also include a functional layer (not shown) including functional molecules.

In an aspect, the article 10, such as an optical device, can include a reflector layer 16, such as a colored reflector layer, having a first color; and the selective light modulator layer 14 has a second color the same as the first color, as shown in FIG. 1. For example, the reflector layer 16 can be red and the selective light modulator layer can also be red.

In another aspect, the article 10, such as an optical device, can include a reflector layer 16, such as a colored reflector layer, having a first color; and the selective light modulator layer 14 has a second color that is different from the first color, also as shown in FIG. 1. For example, the reflector layer 16 can be red and the selective light modulator layer 14 can be blue.

The article 10, such as an optical device, can include a selective light modulator layer 14 that is a first selective light modulator layer 14; and can further include a second selective light modulator layer 14'. The first selective light modulator layer 14 is present on a first surface of the reflector layer 16 and the second selective light modulator layer 14' is present on a second surface of the reflector layer 16, as shown in FIG. 2. Each of the first and second selective light modulator layer 14, 14' can have the same or different color. Additionally, the reflector layer 16 can be a colored reflector layer 16 that has the same or different color than each of the first and second selective light modulator layer 14, 14'. For example, the first selective light modulator layer 14 can be a second color red, the reflector layer can be a first color blue, and the second selective light modulator layer 14' can be red. In another aspect, the first selective light modulator layer 14 can be a second color red, the reflector layer can include copper and can be a first color red (perhaps having a different hue), and the second selective light modulator layer 14' can be red. In a further aspect, the first selective light modulator layer 14 can be a second color red, the reflector layer can be a first color blue, and the second selective light modulator layer 14' can be yellow.

The article 10, as shown in FIGS. 3-8, can exhibit a metallic effect because the edges of the article, such as a flake or an optical device, can act as a secondary color defining feature, such as an azimuthal color attribute. In an aspect, the article 10 can include a reflector layer 16 having a first surface, a second surface opposite the first surface, a third surface, and a fourth surface opposite the third surface; and a first selective light modulator layer 14 external to the first surface of the reflector layer 16; wherein at least one of the third surface and the fourth surface of the reflector layer 16 includes an azimuthal modulator layer 12. The article 10 can further include a second selective light modulator layer 14' external to the second surface of the reflector layer 16. The reflector layer 16 can be as described above. The first selective light modulator layer 14, second selective light modulator layer 14', first azimuthal modulator layer 12, and second azimuthal modulator layer 12' can be as described below.

The first selective light modulator layer 14 can provide a first color attribute to the article 10, such as an optical device. For example, the first selective modulator layer 14 can provide a red color to the optical device. The first color attribute can be present at a first viewing angle.

The azimuthal modulator layer 12, 12' can provide a second color attribute to the article 10, such as the optical device. For example, the azimuthal modulator layer 12, 12' can provide a black color to the optical device. The second color attribute can be present at a second viewing angle, wherein the second viewing angle is different from the first viewing angle. The second color attribute can be different from a first color attribute. The azimuthal modulator layer 12, 12' can allow the introduction of color hue to the article 10, such as visible from viewing angles other than normal, to articles 10 that can have their first color attribute defined by the selective light modulator layer 14.

Figure 3:
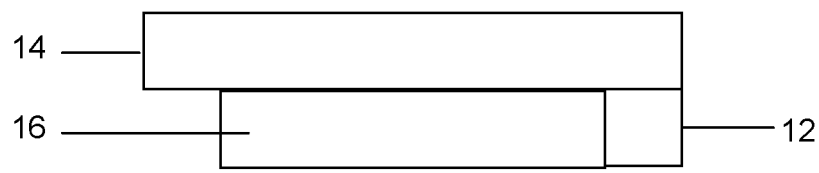
FIG. 3 is a cross-sectional view of an article according to another aspect of the present disclosure.

As shown in FIG. 3, the article 10 can include a reflector layer 16; a selective light modulator layer 14 external to a first surface of the reflector layer 16; and an azimuthal modulator layer 12 external to a third surface of the reflector layer 16. In an aspect, the azimuthal modulator layer 12 can protect at least one of the third surface and the fourth surface of the reflector layer 16. A second surface opposite the first surface and a fourth surface opposite the third surface of the reflector layer 16 can be open to the air. The reflector layer 16 can be as described above. In an aspect, the reflector layer 16 can include a colored material.

Figure 4:
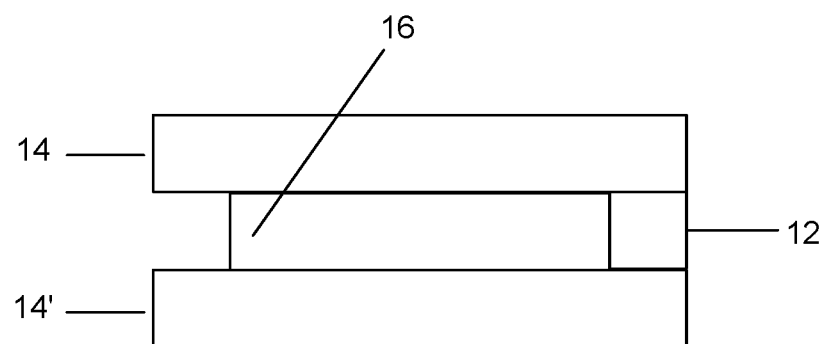
FIG. 4 is a cross-sectional view of an article according to another aspect of the present disclosure.

As shown in FIG. 4, the article 10 can include a reflector layer 16; a first selective light modulator layer 14 external to a first surface of the reflector layer 16; a second light selective light modulator layer 14' external to the second surface of the reflector layer 16; and an azimuthal modulator layer 12 external to a third surface of the reflector layer 16. In an aspect, the azimuthal modulator layer 12 can protect at least one of the third surface and the fourth surface of the reflector layer 16. A fourth surface opposite the third surface of the reflector layer 16 can be open to the air. The reflector layer 16 can be as described above. In an aspect, the reflector layer 16 can include a colored material.

Figure 5:
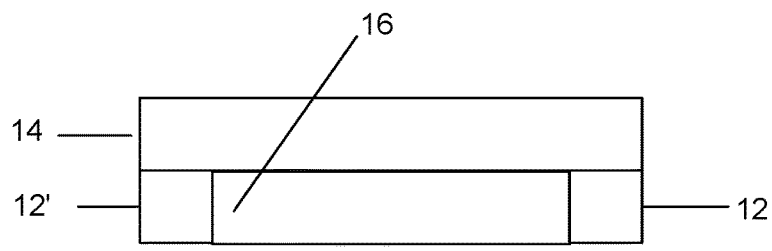
FIG. 5 is a cross-sectional view of an article according to another aspect of the present disclosure.

As shown in FIG. 5, the article 10 can include a reflector layer 16; a first selective light modulator layer 14 external to a first surface of the reflector layer 16; a first azimuthal modulator layer 12 external to a third surface of the reflector layer 16; and a second azimuthal modulator layer 12' external to a fourth surface of the reflector layer 16. In an aspect, at least one of the first and second azimuthal modulator layer 12, 12' can protect at least one of the third surface and the fourth surface of the reflector layer 16. A second surface opposite the first surface of the reflector layer 16 can be open to the air. The reflector layer 16 can be as described above. In an aspect, the reflector layer 16 can include a colored material.

Figure 6:
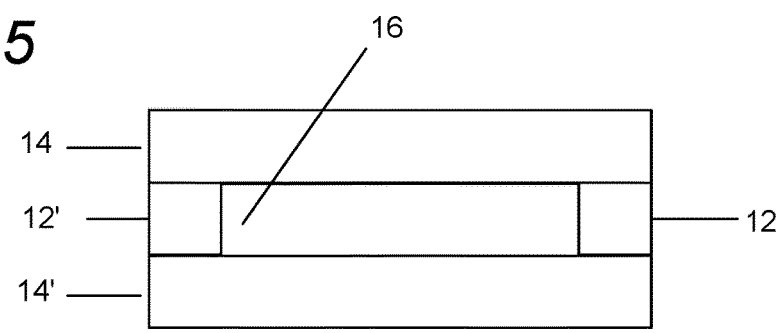
FIG. 6 is a cross-sectional view of an article according to another aspect of the present disclosure.

As shown in FIG. 6, the article 10 can include a reflector layer 16; a first selective light modulator layer 14 external to a first surface of the reflector layer 16; a second selective light modulator layer 14' external to a second surface of the reflector layer 16; a first azimuthal modulator layer 12 external to a third surface of the reflector layer 16; and a second azimuthal modulator layer 12' external to a fourth surface of the reflector layer 16. In an aspect, at least one of the first and second azimuthal modulator layer 12, 12' can protect at least one of the third surface and the fourth surface of the reflector layer 16. The reflector layer 16 can be as described above. In an aspect, the reflector layer 16 can include a colored material.

As shown in FIG. 7, the article 10 can include a reflector layer 16; a first selective light modulator layer 14 external to a first surface of the reflector layer 16; a first azimuthal modulator layer 12 external to a third surface of the reflector layer 16 and external to a third surface of the first selective light modulator layer 14; and a second azimuthal modulator layer 12' external to a fourth surface of the reflector layer 16 and external to a fourth surface of the first selective light modulator layer 14. The first selective light modulator layer 14 can have a first surface; a second surface opposite the first surface; a third surface; and a fourth surface opposite the third surface. In an aspect, at least one of the first and second azimuthal modulator layer 12, 12' can protect at least one of the third surface of the reflector layer 16, the fourth surface of the reflector layer 16, the third surface of the first selective light modulator layer 14, and the fourth surface of the first selective light modulator layer 14. The reflector layer 16 can be as described above. In an aspect, the reflector layer 16 can include a colored material.

As shown in FIG. 8, the article 10 can include a reflector layer 16; a first selective light modulator layer 14 external to a first surface of the reflector layer 16; a second selective light modulator layer 14' external to a second surface of the reflector layer 16; a first azimuthal modulator layer 12 external to a third surface of the reflector layer 16, external to a third surface of the first selective light modulator layer 14, and external to a third surface of the second selective light modulator layer 14'; and a second azimuthal modulator layer 12' external to a fourth surface of the reflector layer 16, external to a fourth surface of the first selective light modulator layer 14, and external to a fourth surface of the second selective light modulator layer 14'. The first and second selective light modulator layer 14, 14' can each independently have a first surface; a second surface opposite the first surface; a third surface; and a fourth surface opposite the third surface. In an aspect, at least one of the first and second azimuthal modulator layer 12, 12' can protect at least one of the third surface of the reflector layer 16, the fourth surface of the reflector layer 16, the third surface of the first selective light modulator layer 14, the fourth surface of the first selective light modulator layer 14, the third surface of the second selective light modulator layer 14', and the fourth surface of the second selective light modulator layer 14'. The reflector layer 16 can be as described above. In an aspect, the reflector layer 16 can include a colored material.

With regard to FIGS. 3-8, the azimuthal modulator layer 12, 12' can include a metal chemically converted to a colored compound, as disclosed above with regard to the reflector layer 16. In an aspect, the azimuthal modulator layer 12, 12' can also include at least one of pigments and organic dyes. The azimuthal modulator layer 12, 12' can protect the surfaces of the article 10 from corrosion.

The article 10 disclosed herein can include a first selective light modulator layer (SLML) 14 and/or a second selective light modulator layer 14'. The SLML is a physical layer comprising a plurality of optical functions aiming at modulating (absorbing and or emitting) light intensity in different, selected regions of spectrum of electromagnetic radiation with wavelengths ranging from about 0.2 μm to about 20 μm. The article 10 can include an asymmetric layer structure in which the SLML 14 can selectively modulate light by means of absorption provided by a selective SLMS (discussed in more detail below). In particular, the article 10 can include a SLML 14 that selectively absorbs specific wavelengths of energy, such as light.

A SLML 14 (and/or the materials within the SLML 14) can selectively modulate light. For example, an SLML 14 can control the amount of transmission in specific wavelengths. In some examples, the SLML 14 can selectively absorb specific wavelengths of energy (e.g., in the visible and/or non-visible ranges). For example, the SLML 14 can be a "colored layer" and/or a "wavelength selective absorbing layer." In some examples, the specific wavelengths absorbed can cause the article 10 to appear a specific color. For example, the SLML 14 can appear red to the human eye (e.g., the SLML 14 can absorb wavelengths of light below approximately 620 nm and thus reflect or transmit wavelengths of energy that appear red). This can be accomplished by adding selective light modulator particles (SLMP) that are colorants (e.g., organic and/or inorganic pigments and/or dyes) to a host material, such as a dielectric material, including but not limited to a polymer. For example, in some instances, the SLML 14 can be a colored plastic.

In some examples, some or all of the specific wavelengths absorbed can be in the visible range (e.g., the SLML 14 can be absorbing throughout the visible, but transparent in the infrared). The resulting article 10 would appear black, but reflect light in the infrared. In some examples described above, the wavelengths absorbed (and/or the specific visible color) of the article 10 and/or SLML 14 can depend, at least in part, on the thickness of the SLML 14. Additionally, or alternatively, the wavelengths of energy absorbed by the SLML 14 (and/or the color in which these layers and/or the flake appears) can depend in part on the addition of certain aspects to the SLML 14. In addition to absorbing certain wavelengths of energy, the SLML 14 can achieve at least one of bolstering the reflector layer 16 against degradation; enabling release from a substrate; enabling sizing; providing some resistance to environmental degradation, such as oxidation of aluminum or other metals and materials used in the reflector layer 16; and high performance in transmission, reflection, and absorption of light based upon the composition and thickness of the SLML 14.

In some examples, in addition to or as an alternative to the SLML 14 selectively absorbing specific wavelengths of energy and/or wavelengths of visible light, the SLML 14 of the article 10 can control the refractive index and/or the SLML 14 can include selective light modulator particles (SLMPs) that can control refractive index. SLMPs that can control the refractive index of the SLML 14 can be included with the host material in addition to or as an alternative to an absorption controlling SLMPs (e.g., colorants). In some examples, the host material can be combined with both absorption controlling SLMPs and refractive index SLMPs in the SLML 14. In some examples, the same SLMP can control both absorption and refractive index.

The performance of the SLML 14 can be determined based upon the selection of materials present in the SLML 14. In an aspect, the SLML 14 can improve at least one of the following properties: flake handling, corrosion, alignment, and environmental performance of any other layers within article 10, e.g., the reflector layer 16.

The first and (optionally second, third, fourth, etc.) SLML 14 can each independently comprise a host material alone, or a host material combined with a selective light modulator system (SLMS). In an aspect, at least one of the first SLML 14 can include a host material. In another aspect, at least one of the first SLML 14 can include a host material and a SLMS. The SLMS can include a selective light modulator molecule (SLMM), a selective light modulator particle (SLMP), an additive, or combinations thereof.

The composition of the SLML 14 can have a solids content ranging from about 0.01% to about 100%, for example from about 0.05% to about 80%, and as a further example from about 1% to about 30%. In some aspects, the solids content can be greater than 3%. In some aspects, the composition of the SLML 14 can have a solids content ranging from about 3% to about 100%, for example from about 4% to 50%.

The host material of the first SLML 14 can independently be a film forming material applied as a coating liquid and serving optical and structural purposes. The host material can be used as a host (matrix) for introducing, if necessary, a guest system, such as the selective light modulator system (SLMS), for providing additional light modulator properties to the article 10.

The host material can be a dielectric material. Additionally, or alternatively, the host material can be at least one of an organic polymer, an inorganic polymer, and a composite material. Non-limiting examples of the organic polymer include thermoplastics, such as polyesters, polyolefins, polycarbonates, polyamides, polyimides, polyurethanes, acrylics, acrylates, polyvinylesters, polyethers, polythiols, silicones, fluorocarbons, and various co-polymers thereof; thermosets, such as epoxies, polyurethanes, acrylates, melamine formaldehyde, urea formaldehyde, and phenol formaldehyde; and energy curable materials, such as acrylates, epoxies, vinyls, vinyl esters, styrenes, and silanes. Non-limiting examples of inorganic polymers includes silanes, siloxanes, titanates, zirconates, aluminates, silicates, phosphazanes, polyborazylenes, and polythiazyls.

The first SLML 14 can include from about 0.001% to about 100% by weight of a host material. In an aspect, the host material can be present in the SLML 14 in an amount ranging from about 0.01% to about 95% by weight, for example from about 0.1% to about 90%, and as a further example from about 1% to about 87% by weight of the SLML 14.

The SLMS, for use in the SLML 14 with the host material, can each independently comprise selective light modulator particles (SLMP), selective light modulator molecules (SLMM), additives, or a combination thereof. The SLMS can also comprise other materials. The SLMS can provide modulation of the amplitude of electromagnetic radiation (by absorption, reflectance, fluorescence etc.) in a selective region or the entire spectral range of interest (0.2 µm to 20 µm).

The first SLML 14 can each independently include in an SLMS a SLMP. The SLMP can be any particle combined with the host material to selectively control light modulation, including, but not limited to color shifting particles, dyes, colorants include colorant includes one or more of dyes, pigments, reflective pigments, color shifting pigments, quantum dots, and selective reflectors. Non-limiting examples of a SLMP include: organic pigments, inorganic pigments, quantum dots, nanoparticles (selectively reflecting and/or absorbing), micelles, etc. The nanoparticles can include, but are not limited to organic and metalorganic materials having a high value of refractive index (n>1.6 at wavelength of about 550 nm); metal oxides, such as $TiO_2$, $ZrO_2$, $In_2O_3$, $In_2O_3$—$SnO$, $SnO_2$, $Fe_xO_y$ (wherein x and y are each independently integers greater than 0), and $WO_3$; metal sulfides, such as ZnS, and $Cu_xS_y$ (wherein x and y are each independently integers greater than 0); chalcogenides, quantum dots, metal nanoparticles; carbonates; fluorides; and mixtures thereof.

Examples of a SLMM include but are not limited to: organic dyes, inorganic dyes, micelles, and other molecular systems containing a chromophore.

In some aspects, SLMS of the first SLML 14 can include at least one additive, such as a curing agent, and a coating aid.

The curing agent can be a compound or material that can initiate hardening, vitrification, crosslinking, or polymerizing of the host material. Non-limiting examples of a curing agent include solvents, radical generators (by energy or chemical), acid generators (by energy or chemical), condensation initiators, and acid/base catalysts.

Non-limiting examples of the coating aid include leveling agents, wetting agents, defoamers, adhesion promoters, antioxidants, UV stabilizers, curing inhibition mitigating agents, antifouling agents, corrosion inhibitors, photosensitizers, secondary crosslinkers, and infrared absorbers for enhanced infrared drying. In an aspect, the antioxidant can be present in the composition of the SLML 14 in an amount ranging from about 25 ppm to about 5% by weight.

The first SLML 14 can each independently comprise a solvent. Non-limiting examples of solvents can include acetates, such as ethyl acetate, propyl acetate, and butyl acetate; acetone; water; ketones, such as dimethyl ketone (DMK), methylethyl ketone (MEK), secbutyl methyl ketone (SBMK), ter-butyl methyl ketone (TBMK), cyclopenthanon, and anisole; glycol and glycol derivatives, such as propylene glycol methyl ether, and propylene glycol methyl ether acetate; alcohols, such as isopropyl alcohol, and diacetone alcohol; esters, such as malonates; heterocyclic solvents, such as n-methyl pyrrolidone; hydrocarbons, such as toluene, and xylene; coalescing solvents, such as glycol ethers; and mixtures thereof. In an aspect, the solvent can be present in the first SLML 14' in an amount ranging from about 0% to about 99.9%, for example from about 0.005% to about 99%, and as a further example from about 0.05% to about 90% by weight relative to the total weight of the SLML 14.

In some examples, the first SLML 14 can include a composition having at least one of (i) a photoinitiator, (ii) an oxygen inhibition mitigation composition, (iii) a leveling agent, and (iv) a defoamer.

The oxygen inhibition mitigation composition can be used to mitigate the oxygen inhibition of the free radical material. The molecular oxygen can quench the triplet state of a photoinitiator sensitizer or it can scavenge the free radicals resulting in reduced coating properties and/or uncured liquid surfaces. The oxygen inhibition mitigation composition can reduce the oxygen inhibition or can improve the cure of any SLML 14.

The oxygen inhibition composition can comprise more than one compound. The oxygen inhibition mitigation composition can comprise at least one acrylate, for example at least one acrylate monomer and at least one acrylate oligomer. In an aspect, the oxygen inhibition mitigation composition can comprise at least one acrylate monomer and two acrylate oligomers. Non-limiting examples of an acrylate for use in the oxygen inhibition mitigation composition can include acrylates; methacrylates; epoxy acrylates, such as modified epoxy acrylate; polyester acrylates, such as acid functional polyester acrylates, tetra functional polyester acrylates, modified polyester acrylates, and bio-sourced polyester acrylates; polyether acrylates, such as amine modified polyether acrylates including amine functional acrylate co-initiators and tertiary amine co-initiators; urethane acrylates, such aromatic urethane acrylates, modified aliphatic urethane acrylates, aliphatic urethane acrylates, and aliphatic allophanate based urethane acrylates; and monomers and oligomers thereof. In an aspect, the oxygen inhibition mitigation composition can include at least one acrylate oligomer, such as two oligomers. The at least one acrylate oligomer can be selected/chosen from a polyester acrylate and a polyether acrylate, such as a mercapto modified polyester acrylate and an amine modified polyether tetraacrylate. The oxygen inhibition mitigation composition can also include at least one monomer, such as 1,6-hexanediol diacrylate. The oxygen inhibition mitigation composition can be present in the first SLML 14 in an amount ranging from about 5% to about 95%, for example from about 10% to about 90%, and as a further example from about 15% to about 85% by weight relative to the total weight of the SLML 14.

In some examples, the host material of the SLML 14 can use a non-radical cure system such as a cationic system. Cationic systems are less susceptible to the mitigation of the oxygen inhibition of the free radical process, and thus may not require an oxygen inhibition mitigation composition. In an example, the use of the monomer 3-ethyl-3-hydroxymethyloxetane does not require an oxygen mitigation composition.

In an aspect, the first SLML 14 can each independently include at least one photoinitiator, such as two photoinitiators, or three photoinitiators. The photoinitiator can be used for shorter wavelengths. The photoinitiator can be active for actinic wavelength. The photoinitiator can be a Type 1 photoinitiator or a Type II photoinitiator. The SLML 14 can include only Type I photoinitiators, only Type II photoinitiators, or a combination of both Type I and Type II photoinitiators. The photoinitiator can be present in the composition of the SLML 14 in an amount ranging from about 0.25% to about 15%, for example from about 0.5% to about 10%, and as a further example from about 1% to about 5% by weight relative to the total weight of the composition of the SLML 14.

The photoinitiator can be a phosphineoxide. The phosphineoxide can include, but is not limited to, a monoacyl phosphineoxide and a bis acyl phosphine oxide. The mono acyl phosphine oxide can be a diphenyl (2,4,6-trimethylbenzoyl)phosphineoxide. The bis acyl phosphine oxide can be a bis (2,4,6-trimethylbenzoyl)phenylphosphineoxide. In an aspect, at least one phosphineoxide can be present in the composition of the SLML 14. For example, two phosphineoxides can be present in the composition of the SLML 14.

A sensitizer can be present in the composition of the SLML 14 and can act as a sensitizer for Type 1 and/or a Type II photoinitiators. The sensitizer can also act as a Type II photoinitiator. In an aspect, the sensitizer can be present in the composition of the SLML 14 in an amount ranging from about 0.05% to about 10%, for example from about 0.1% to about 7%, and as a further example from about 1% to about 5% by weight relative to the total weight of the composition of the SLML 14. The sensitizer can be a thioxanthone, such as 1-chloro-4-propoxythioxanthone.

In an aspect, the SLML 14 can include a leveling agent. The leveling agent can be a polyacrylate. The leveling agent can eliminate cratering of the composition of the SLML 14. The leveling agent can be present in the composition of the SLML 14 in an amount ranging from about 0.05% to about 10%, for example from about 1% to about 7%, and as a further example from about 2% to about 5% by weight relative to the total weight of the composition of the SLML 14.

The first SLML 14 can also include a defoamer. The defoamer can reduce surface tension. The defoamer can be a silicone free liquid organic polymer. The defoamer can be present in the composition of the SLML 14 in an amount ranging from about 0.05% to about 5%, for example from about 0.2% to about 4%, and as a further example from about 0.4% to about 3% by weight relative to the total weight of the composition of the SLML 14.

The first SLML 14 can each independently have a refractive index of greater or less than about 1.5. For example, each SLML 14' can have a refractive index of approximately 1.5. The refractive index of each SLML 14 can be selected to provide a degree of color travel required wherein color travel can be defined as the change in hue angle measured in L*a*b* color space with the viewing angle. In some examples, each SLML 14 can include a refractive index in a range of from about 1.1 to about 3.0, about 1.0 to about 1.3, or about 1.1 to about 1.2. In some examples, the refractive index of each SLMLs 14 can be less than about 1.5, less than about 1.3, or less than about 1.2. In some examples, SLML 14 can have substantially equal refractive indexes or different refractive indexes one from the other, if more than one SLML is present in the article 10.

The first SLML 14 can have a thickness ranging from about 1 nm to about 10000 nm, about 10 nm to about 1000 nm, about 20 nm to about 500 nm, about 1 nm, to about 100 nm, about 10 nm to about 1000 nm, about 1 nm to about 5000 nm. In an aspect, the article 10, such as an optical device, can have an aspect ratio of 1:1 to 1:50 thickness to width.

One of the benefits of the articles 10 described herein, however, is that, in some examples, the optical effects appear relatively insensitive to thickness variations. Thus, in some aspects, each SLML 14 can independently have a variation in optical thickness of less than about 5%. In an aspect, each SLML 14 can independently include an optical thickness variation of less than about 3% across the layer. In an aspect, each SLML 14 can independently have less than about 1% variation in optical thickness across the layer having a thickness of about 50 nm.

In an aspect, the article 10, such as an optical device in the form of a flake, foil or sheet, can also include a substrate and/or a release layer. In an aspect, the release layer can be disposed between the substrate and the article 10.

Additionally, or alternatively, the article 10 in the form of a flake, sheet, or foil can also include a hard coat or protective layer on the article 10. In some examples, these layers (hard coat or protective layer) do not require optical qualities.

The article 10, such as optical devices, described herein can be made in any way. For example, a sheet can be made and then divided, broken, ground, etc. into smaller pieces forming an optical device. In some examples, the sheet can be created by a liquid coating process, including, but not limited the processes described below and/or with respect to FIG. 9.

There is disclosed a method for manufacturing an article 10, for example in the form of a sheet, flake, or foil, as described herein. The method can comprise depositing on a substrate a colored reflector layer 16; depositing a selective light modulator layer 14 onto the colored reflector layer 16 using a liquid coating process. The selective light modulator layer 14 can be a first selective light modulator layer, and the method can further include depositing a second selective light modulator layer 14' between the substrate and the colored reflector layer 16.

The colored reflector layer 16 is not subjected to passivation. The colored reflector layer can improve a color attribute of the selective light modulator layer 14. The colored reflector layer 16 can control gassing. The colored reflector layer 16 can be deposited using a physical vapor deposition process. The colored reflector layer 16 can include a colored metal, colored metal alloys, colored nonmetals, and metals chemically converted into a colored compound. The colored reflector layer 16 can be a colored metal chosen from copper, gold, and bronzes. The metals that are chemically converted into a colored compound include aluminum and stainless steel. The colored reflector layer 16 can include a colored non-metal including polyacetylene and organic materials.

In another aspect, there is disclosed a method of making an article 10, such as an optical device, including depositing on a substrate a reflector layer 16 having a first surface, a second surface opposite the first surface, a third surface, and a fourth surface opposite the third surface; depositing on the first surface of the reflector layer 16 a first selective light modulator layer 14; and providing an azimuthal modulator layer 12 on at least one of the third surface and the fourth surface of the reflector layer 16. The method can also include depositing a second selective light modulator layer 14' between the substrate and the reflector layer 16. The azimuthal modulator layer 12, 12' can inhibit corrosion of the reflector layer 16. The first and second selective light modulator layer 14, 14' can provide a first color attribute and the azimuthal modulator layer 12, 12' can provide a second color attribute different from the first color attribute. The azimuthal modulator layer 12, 12' can include a chemically converted portion of the reflector layer 16. The azimuthal modulator layer 12, 12' can include pigments and organic dyes.

In the methods, the substrate can comprise a release layer. In the disclosed methods, the reflector layer 16 can be deposited using known conventional deposition process, such as physical vapor deposition, chemical vapor deposition, thin-film deposition, atomic layer deposition, etc., including modified techniques such as plasma enhanced and fluidized bed.

The substrate can be made of a flexible material. The substrate can be any suitable material that can receive the deposited layers. Non-limiting examples of suitable substrate materials include polymer web, such as polyethylene terephthalate (PET), glass foil, glass sheets, polymeric foils, polymeric sheets, metal foils, metal sheets, ceramic foils, ceramic sheets, ionic liquid, paper, silicon wafers, etc. The substrate can vary in thickness, but can range for example from about 2 µm to about 100 µm, and as a further example from about 10 to about 50 µm.

The first and/or second SLML 14, 14' can be deposited by a liquid coating process, such as a slot die process. The liquid coating process can include, but is not limited to: slot-bead, slide bead, slot curtain, slide curtain, in single and multilayer coating, tensioned web slot, gravure, roll coating, and other liquid coating and printing processes that apply a liquid on to a substrate or previously deposited layer to form a liquid layer or film that is subsequently dried and/or cured.

The substrate can then be released from the deposited layers to create the article 10. In an aspect, the substrate can be cooled to embrittle an associated release layer, if present. In another aspect, the release layer could be embrittled for example by heating and/or curing with photonic or e-beam energy, to increase the degree of cross-linking, which would enable stripping. The deposited layers can then be stripped mechanically, such as sharp bending or brushing of the surface. The released and stripped layers can be sized into article 10, such as an optical device in the form of a flake, foil, or sheet, using known techniques.

In another aspect, the deposited layers can be transferred from the substrate to another surface. The deposited layers can be punched or cut to produce large flakes with well-defined sizes and shapes.

The liquid coating process can allow for the transfer of the composition of the SLML 14, 14' at a faster rate as compared to other deposition techniques, such as vapor deposition. Additionally, the liquid coating process can allow for a wider variety of materials to be used in the SLML 14, 14' with a simple equipment set up. It is believed that the SLML 14, 14' formed using the disclosed liquid coating process can exhibit improved optical performance.

Figure 9:
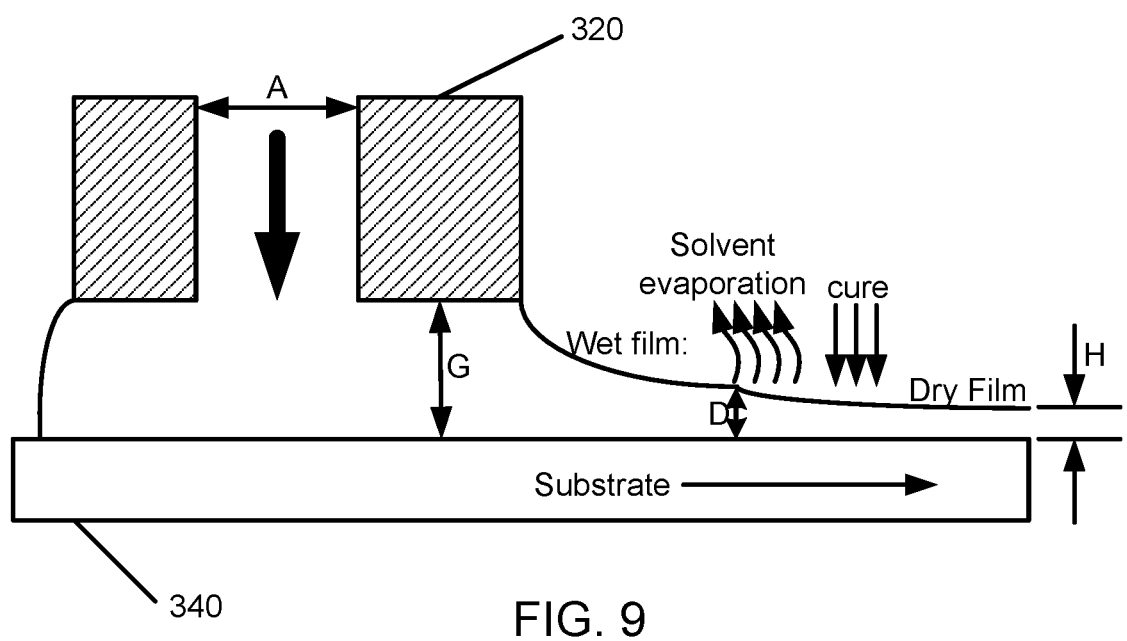
FIG. 9 is a cross sectional view of a liquid coating process showing deposition of a layer, such as an SLML layer, according to an example of the present disclosure.

FIG. 9 illustrates the formation of a layer using a liquid coating process. The composition of a layer, e.g. SLML 14 (a liquid coating composition) can be inserted into a slot die 320 and deposited on a substrate 340 resulting in a wet film. With reference to the processes disclosed above, the substrate 340 can include at least one of a substrate, a release layer, a reflector layer 16, and previously deposited layers. The distance from the bottom of the slot die 320 to the substrate 340 is the slot gap G. As can be seen in FIG. 9, the liquid coating composition can be deposited at a wet film thickness D that is greater than a dry film thickness H. After the wet film of the liquid coating composition has been deposited on the substrate 340, any solvent present in the wet film of the liquid coating composition can be evaporated. The liquid coating process continues with curing of the wet film of the liquid coating composition to result in a cured, self-leveled layer having the correct optical thickness H (ranging from about 30 to about 700 nm). It is believed that the ability of the liquid coating composition to self-level results in a layer having a reduced optical thickness variation across the layer. Ultimately, an article 10, such as an optical device, comprising the self-leveled liquid coating composition can exhibit increased optical precision. For ease of understanding, the terms "wet film" and "dry film" will be used to refer to the liquid coating composition at various stages of the liquid coating process.

The liquid coating process can comprise adjusting at least one of a coating speed and a slot gap G to achieve a wet film with a predetermined thickness D. The liquid coating composition can be deposited having a wet film thickness D ranging from about 0.1 µm to about 500 µm, for example from about 0.1 µm to about 5 µm. The liquid coating composition formed with a wet film thickness D in the disclosed range can result in a stable SLML layer, such as a dielectric layer, i.e., without breaks or defects such as ribbing or streaks. In an aspect, the wet film can have a thickness of about 10 µm for a stable wet film using a slot die bead mode with a coating speed up to about 100 m/min. In another aspect, the wet film can have a thickness of about 6-7 µm for a stable wet film using a slot die curtain mode with a coating speed up to about 1200 m/min.

The liquid coating process can include a ratio of slot gap G to wet film thickness D of about 1 to about 100 at speeds from about 0.1 to about 1000 m/min. In an aspect, the ratio is about 9 at a coating speed of about 100 m/min. In an aspect, the ratio can be about 20 at a coating speed of about 50 m/min. The liquid coating process can have a slot gap G ranging from about 0 to about 1000 µm. A smaller slot gap G can allow for a reduced wet film thickness. In slot-bead mode higher coating speeds can be achieved with a wet film thickness greater than 10 µm.

The liquid coating process can have a coating speed ranging from about 0.1 to about 1000 m/min, for example from about 25 m/min to about 950 m/min, for example from about 100 m/min to about 900 m/min, and as a further example from about 200 m/min to about 850 m/min. In an aspect, the coating speed is greater than about 150 m/min, and in a further example is greater than about 500 m/min.

In an aspect, the coating speed for a bead mode liquid coating process can range from about 0.1 m/min to about 600 m/min, and for example from about 50 to about 150 m/min. In another aspect, the coating speed for a curtain mode liquid coating process can range from about 200 m/min to about 1500 m/min, and for example, from about 300 m/min to about 1200 m/min.

As shown in FIG. 9 the solvent can be evaporated from the wet film, such as before the wet film is cured. In an aspect, about 100%, for example about 99.9%, and as a further example about 99.8% of the solvent can be evaporated from the liquid coating composition prior to curing of the liquid coating composition. In a further aspect, trace amounts of solvent can be present in a cured/dry liquid coating composition. In an aspect, a wet film having a greater original weight percent of solvent can result in a dry film having a reduced film thickness H. In particular, a wet film having a high weight percent of solvent and being deposited at a high wet film thickness D can result in a liquid coating composition, such as the SLML 14 having a low dry film thickness H. It is important to note, that after evaporation of the solvent, the wet film remains a liquid thereby avoiding problems such as skinning, and island formation during the subsequent curing steps in the liquid coating process.

The dynamic viscosity of the wet film can range from about 0.5 to about 50 cP, for example from about 1 to about 45 cP, and as a further example from about 2 to about 40 cP. The viscosity measurement temperature is 25° C., the rheology was measured with an Anton Paar MCR 101 rheometer equipped with a solvent trap using a cone/plate 40 mm diameter with 0.3° angle at a gap setting of 0.025 mm.

In an aspect, the liquid coating composition and the solvent can be selected so that the wet film exhibits Newtonian behavior for precision coating of the liquid coating composition using the liquid coating process. The wet film can exhibit Newtonian behavior shear rates up to 10,000 $s^{-1}$ and higher. In an aspect, the shear rate for the liquid coating process can be 1000 $s^{-1}$ for a coating speed up to 25 m/min, for example 3900 $s^{-1}$ for a coating speed up to 100 m/min, and as a further example 7900 $s^{-1}$ for a coating speed up to 200 m/min. It will be understood that a maximum shear rate can occur on a very thin wet film, such as 1 µm thick.

As the wet film thickness is increased, the shear rate can be expected to decrease, for example decrease 15% for a 10 µm wet film, and as a further example decrease 30% for a 20 µm wet film.

The evaporation of the solvent from the wet film can cause a change in viscosity behavior to pseudoplastic, which can be beneficial to achieve a precision SLML 14. The dynamic viscosity of the deposited first and second SLML 14, 14', after any solvent has been evaporated, can range from about 10 cP to about 3000 cP, for example from about 20 cP to about 2500 cP, and as a further example from about 30 cP to about 2000 cP. When evaporating the solvent, if present, from the wet film there can be an increase in viscosity to the pseudoplastic behavior. The pseudoplastic behavior can allow for self-leveling of the wet film.

In an aspect, the method can include evaporating the solvent present in the wet film using known techniques. The amount of time required to evaporate the solvent can be dependent upon the speed of the web/substrate and the dryer capacity. In an aspect, the temperature of the dryer (not shown) can be less than about 120° C., for example less than about 100° C., and as a further example less than about 80° C.

The wet film deposited using a liquid coating process can be cured using known techniques. In an aspect, the wet film can be cured using a curing agent utilizing at least one of an ultraviolet light, visible light, infrared, or electron beam. Curing can proceed in an inert or ambient atmosphere. In an aspect, the curing step utilizes an ultraviolet light source having a wavelength of about 395 nm. The ultraviolet light source can be applied to the wet film at a dose ranging from about 200 mJ/$cm^2$ to about 1000 mJ/$cm^2$, for example ranging from about 250 mJ/$cm^2$ to about 900 mJ/$cm^2$, and as a further example from about mJ/$cm^2$ to about 850 mJ/$cm^2$.

The wet film can crosslink by known techniques. Non-limiting examples include photoinduced polymerization, such as free radical polymerization, spectrally sensitized photoinduced free radical polymerization, photoinduced cationic polymerization, spectrally sensitized photoinduced cationic polymerization, and photoinduced cycloaddition; electron beam induced polymerization, such as electron beam induced free radical polymerization, electron beam induced cationic polymerization, and electron beam induced cycloaddition; and thermally induced polymerization, such as thermally induced cationic polymerization.

A SLML 14, 14' formed using the liquid coating process can exhibit improved optical performance, i.e., be a precision SLML. In some examples, a precision SLML 14, 14' can be understood to mean a SLML having less than about 3% optical thickness variation, about 5% optical thickness variation, or about 7% optical thickness variation across the layer.

In an aspect, the liquid coating process can include adjusting at least one of speed from about 5 to about 100 m/min and a coating gap from about 50 µm to about 100 µm to deposit a wet film from about 2 µm to 10 µm of the selective light modulator layer with a predetermined thickness from about 500 nm to about 1500 nm. In a further aspect, the process can include a speed of 30 m/min, a 75 um gap, 10 um wet film, dry film thickness 1.25 um.

The articles 10 described above and, for example, illustrated in the Figures can be further described by the following examples. In an example, an article 10 can include a selective light modulator layer 14 can include an alicyclic epoxy resin host using a solvent dye as the SLMM, and the reflector lay 16 can include aluminum.

In an example, the article 10 can include a first SLML 14 including an aliphatic epoxy resin host using a diketopyrrolopyrrole insoluble red dye as the SLMP, and the reflector layer 16 can include aluminum.

In an example, article 10 can include a first SLML 14 including an acrylate oligomer resin host using white pigment (Titania) as the SLMP.

In an example, an article 10 can include the SLML 14 including an acrylate oligomer resin host using black IR transparent pigment as the SLML, and the reflector layer 16 can include aluminum.

In an example, an article 10 can include an azimuthal layer 12 including a surface selective dye staining for both a first SLML 14 and a reflector layer 16 (metal and non-metal) sides. In an aspect, the article 10 can further include a functional layer on a second surface of both of a first selective light modulator layer 14 and a second selective light modulator layer 14' to prevent the dye staining of the external surfaces (the second surface of the SLML 14, 14').

In an example, an article 10 can include the azimuthal layer 12 including selective decorative anodizing of metal on the perimeter of the pigment flake.

In an example, an article 10 can include the azimuthal layer 12 including selective dye staining of the first and/or second light modulator layer 14, 14'.

In an example, an article 10 can include the azimuthal layer 12 including two distinct colors, one by selective decorative anodizing of metal, one by selective dye staining of the first selective light modulator layer 14 and/or the reflector layer 16.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. An optical device, comprising:
    a reflector layer including a metal and having a first surface, a second surface opposite the first surface; a third surface, and a fourth surface opposite the third surface;
    a first selective light modulator layer external to the first surface of the reflector layer; and
    an azimuthal modulator layer present on at least one of the third surface and the fourth surface of the reflector layer;
    wherein the azimuthal modulator layer includes the metal chemically converted to a colored metal compound.

2. The optical device of claim 1, wherein the first selective light modulator layer provides a first color attribute to the optical device.

3. The optical device of claim 1, further comprising a second selective light modulator layer external to the second surface of the reflector layer.

4. The optical device of claim 1, wherein the azimuthal modulator layer provides a second color attribute to the optical device.

5. The optical device of claim 4, wherein the second color attribute is different from a first color attribute.

6. The optical device of claim 2, wherein the first color attribute is present at a first viewing angle.

7. The optical device of claim 4, wherein the second color attribute is present at a second viewing angle.

8. The optical device of claim 7, wherein the second viewing angle is different from a first viewing angle.

9. The optical device of claim 1, wherein the reflector layer includes a colored material.

10. A composition comprising the optical device of claim 1 and a liquid medium.

11. The optical device of claim 1, wherein the azimuthal modulator layer includes at least one of pigments and organic dyes.

12. A method of manufacturing an optical device, comprising:
    depositing on a substrate a reflector layer including a metal having a first surface, a second surface opposite the first surface, a third surface, and a fourth surface opposite the third surface;
    depositing on the first surface of the reflector layer a first selective light modulator layer; and
    providing an azimuthal modulator layer on at least one of the third surface and the fourth surface of the reflector layer,
    wherein the azimuthal modulator layer includes the metal chemically converted to a colored metal compound.

13. The method of claim 12, further comprising depositing a second selective light modulator layer between the substrate and the reflector layer.

14. The method of claim 12, wherein the azimuthal modulator layer inhibits corrosion of the reflector layer.

15. The method of claim 12, wherein the first selective light modulator layer provides a first color attribute and the azimuthal modulator layer provides a second color attribute different from the first color attribute.

16. The method of claim 12, wherein the azimuthal modulator layer includes pigments and organic dyes.

* * * * *